(12) United States Patent
Koie

(10) Patent No.: US 7,751,796 B2
(45) Date of Patent: Jul. 6, 2010

(54) IN-VEHICLE EMERGENCY REPORT DEVICE

(75) Inventor: Yoshio Koie, Handa (JP)

(73) Assignee: Denso Corporation, Kariya (JP)

( * ) Notice: Subject to any disclaimer, the term of this patent is extended or adjusted under 35 U.S.C. 154(b) by 984 days.

(21) Appl. No.: 11/351,194

(22) Filed: Feb. 9, 2006

(65) Prior Publication Data

US 2006/0197681 A1 Sep. 7, 2006

(30) Foreign Application Priority Data

Mar. 3, 2005 (JP) ............................. 2005-058950

(51) Int. Cl.
*H04M 11/04* (2006.01)

(52) U.S. Cl. .................. 455/404.1; 455/567; 455/572; 455/512.1; 455/574; 455/345

(58) Field of Classification Search ............. 455/404.1, 455/345, 567, 572, 512.1, 574
See application file for complete search history.

(56) References Cited

U.S. PATENT DOCUMENTS 6,144,569 A * 11/2000 Rodriguez et al. ............ 363/49

| 6,876,873 | B2 | 4/2005 | Suzuki |
| 2002/0050809 | A1* | 5/2002 | Uchida ....................... 320/149 |
| 2004/0075345 | A1 | 4/2004 | Yoshioka et al. |

FOREIGN PATENT DOCUMENTS

| JP | H10-294823 A | 11/1998 |
| JP | 2000-308144 A | 11/2000 |
| JP | 2001-217927 | 8/2001 |
| JP | 2003-123172 A | 4/2003 |

OTHER PUBLICATIONS

Office Action dated Dec. 1, 2009 from the Japan Patent Office in the corresponding patent application No. 2005-058950 with English translation.

* cited by examiner

*Primary Examiner*—Vincent P Harper
*Assistant Examiner*—Fred A Casca
(74) *Attorney, Agent, or Firm*—Harness, Dickey & Pierce, PLC

(57) ABSTRACT

An in-vehicle emergency report device starts an operation for an emergency report to transmit an emergency report signal to a service center. The operation is interrupted when a battery voltage decreases less than a given voltage. The operation is thereafter re-started when the battery voltage returns to the given voltage or more. This allows all procedures of the emergency report operation to be completed.

4 Claims, 4 Drawing Sheets

IN-VEHICLE EMERGENCY REPORT DEVICE

CROSS REFERENCE TO RELATED APPLICATIONS

This application is based on and incorporates herein by reference Japanese Patent Application No. 2005-58950 filed on Mar. 3, 2005.

FIELD OF THE INVENTION

The present invention relates to an in-vehicle emergency report device.

BACKGROUND OF THE INVENTION

An in-vehicle emergency report device executes an emergency operation for transmitting an emergency report signal to a service center when the vehicle collides with an obstacle or a human, or when a user depresses an emergency report button. This device is powered with a battery: The battery voltage may decrease e.g., when an airbag expands. When the battery voltage decreases less than a given level, the device stops the emergency report operation, posing a problem. To solve this problem, a dedicated accessory battery other than the above battery is mounted (refer to Patent Document 1).

Patent Document 1: JP-2000-322677 A

This accessory battery allows the emergency report device to complete transmitting the emergency report signal to the center without stopping the operation; however, mounting the accessory battery involves an additional cost or an additional space for mounting, posing a problem.

SUMMARY OF THE INVENTION

It is an object of the present invention to provide an in-vehicle emergency report device to properly complete transmitting an emergency report signal to a service center without a dedicated accessory battery mounted.

To achieve the above object, an in-vehicle emergency report device is provided with the following: The device is powered by a battery. A transmission unit is included for transmitting a signal of an emergency report to a center. A control unit is included for (i) starting, when a start trigger for the emergency report generates, an operation of the emergency report to cause the transmission unit to transmit the signal, (ii) interrupting the operation when a battery voltage of the battery decreases from a given voltage or more to less than the given voltage after having started the operation, and (iii) re-starting the operation when the battery voltage returns to the given voltage or more after having interrupted the operation.

Under this structure, even when an emergency report operation is interrupted due to the battery voltage reduction, the operation can be re-started by recovering of the battery voltage without any dedicated accessory battery that is conventionally provided.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
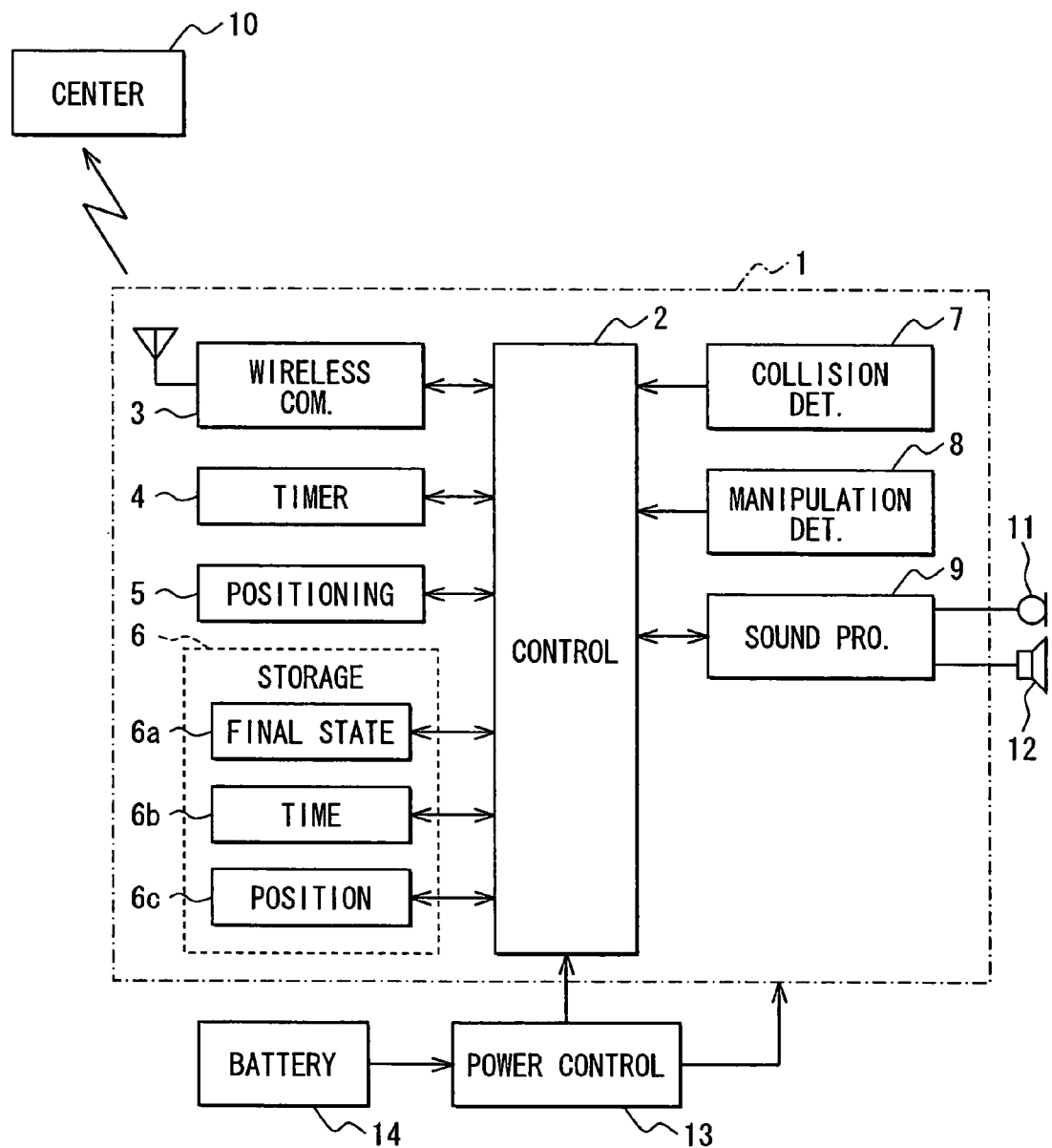
FIG. 1 is a functional block diagram of an overall structure of an in-vehicle emergency report device according to a first embodiment of the present invention.

A first embodiment will be explained with reference to FIGS. 1, 2. As shown in FIG. 1, an in-vehicle emergency report device 1 of the first embodiment includes a control unit 2, a wireless communications unit 3 as a transmission unit, a timer unit 4, a positioning unit 5, a storage unit 6, a collision detection unit 7, a manipulation detection unit 8, and a sound processing unit 9.

The control unit 2 mainly includes a CPU to control an overall operation of the emergency report device 1 for serially executing an emergency report operation in several procedures. The wireless communications unit 3 receives an emergency report instruction from the control unit 2 to transmit an emergency report signal to a service center 10 via a wireless communications network. This emergency report signal includes a vehicle ID (user ID), a position, a time instant, and an emergency index indicating an emergency degree (e.g., high or low).

The timer unit 4 registers or records a time instant to output it to the control unit 2. The positioning unit 5 mainly includes a GPS receiver to detect a position by computing a parameter included in GPS radio waves received from GPS satellites for outputting the detected position to the control unit 2. The position unit 5 may have a different structure to include a distance sensor, a gyroscope, or the like for positioning.

The storage unit 6 includes a final state storage unit 6a, a time storage unit 6b, and a position storage unit 6c. The final storage unit 6a stores either "emergency reporting halfway" flag or "waiting" flag. The "emergency reporting halfway" flag indicates that the control unit 2 started an emergency report operation but has not completed the operation up to its final procedure: The "waiting" flag indicates that the control unit 2 is waiting before starting an emergency report operation. The time storage unit 6b stores a time instant registered by the timer unit 4. The position storage unit 6c stores a position detected by the positioning unit.

The collision detection unit 7 detects that a vehicle collides with an obstacle or a human, and then outputs a collision detection signal to the control unit 2. The manipulation detection unit 8 detects that a user manipulates or depresses an emergency report button, and then outputs a manipulation detection signal to the control unit 2. In this embodiment, that a vehicle collides with an obstacle or a human or that a user manipulates an emergency report button is a start trigger for an emergency report.

The sound processing unit 9 processes transmission sounds inputted via a microphone 11 or reception sounds to be outputted via a speaker 12. When the emergency report device 1 transmits an emergency report signal, the emergency report device and the service center 10 establishes a communications line therebetween. A user can then have a conversation with an operator at the service center 10 via the microphone 11 and the speaker 12 for orally requiring a rescue or reporting an emergency degree or an accident degree.

The power control unit 13 supplies the device with battery voltage from a battery 14 mounted in the vehicle to drive the emergency report device 1. When the battery voltage decreases from a given voltage or more to less than the given voltage, the power control unit 13 outputs a reset signal indicating that the battery voltage has decreased less than the given voltage. This given voltage allows the emergency report device 1 to normally perform an emergency report operation, or allows an emergency report signal to be normally transmitted to the service center 10. Thus constructed emergency report device 1 can be included in a module.

Next, a process of the above structure will be explained with reference to FIG. 2. The control unit 2 executes a process shown in the flowchart in FIG. 2 when normally supplied with the battery voltage and a reset signal is not inputted.

At first, it is determined which of the "emergency reporting halfway" flag or the "waiting" flag the final state storing unit 6a stores (Step S1). In a state where an emergency report operation is not started, the final state storing unit 6a stores the "waiting" flag. When the control unit 2 determines that the "waiting" flag is stored, the control unit 2 then determines whether a start trigger for an emergency report generates (Step S2). This start trigger generates e.g., by receiving a collision detection signal inputted from the collision detection unit 7 when the vehicle collides with an obstacle or a human or by receiving a manipulation detection signal inputted from the manipulation detection unit 8 when a user depresses the emergency report button.

When the control unit 2 detects that the start trigger generates (Step S2: YES), the control unit 2 causes the time storage unit 6b to store a first time instant obtained from the timer unit 4 at this instant (Step S3, S4). The control unit 2 then causes the position storage unit 6c to store a first position obtained from the positioning unit 5 at this instant (Step S5, S6).

Next, the control unit 2 causes the final state storage unit 6a to store the "emergency reporting halfway" flag (Step S7), and starts an emergency report operation by causing the wireless communications unit 3 to transmit an emergency report signal to the service center 10 via the wireless communications network (Step S8).

After starting the emergency report operation, the control unit 2 determines whether all procedures of the emergency report operation is completed (Step S9) and whether a reset signal is inputted from the power control unit 13 (Step S10).

Here, just after the start trigger for the emergency report generates, an airbag may expand to protect a user's body. When the airbag does not expand and, thereby, the battery voltage does not decrease from a given voltage or more to less than the given voltage, the power control unit 13 does not output a reset signal to the control unit 2. When detecting that all the procedures of the emergency report operation is completed (Step S9: YES) without receiving the reset signal from the power control unit 13, the control unit 2 causes the final state storage unit 6a to store the "waiting" flag (Step S11) and then ends the sequence of the process.

In contrast, when the airbag expands and the battery voltage thereby decreases from the given voltage or more to less than the given voltage, the power control unit 13 outputs a reset signal to the control unit 2. When receiving the reset signal from the power control unit 13 (Step S10: YES) before detecting that all the procedures of the emergency report operation is completed, the control unit 2 ends the sequence of the process without causing the final state storage unit 6a to store the "waiting" flag.

Subsequently, when expanding of the airbag is normally completed, the battery voltage that temporarily decreased to less than the given voltage recovers to the given voltage or more; thereby, the reset signal becomes not being inputted from the power control unit 13. In this case, control unit 2 restarts the process shown in the flowchart in FIG. 2.

Furthermore, in this case, the final state storage unit 6a stores the "emergency reporting halfway" flag instead of the "waiting" flag under the state where all the procedures are not completed. Here, since the control unit 2 thereby detects that the "emergency reporting halfway" flag is stored in the final state storage unit 6a, the control unit 2 obtains a second time instant from the timer unit 4 at this instant (Step S12). The control unit 2 then determines whether a time period or difference from the first time instant obtained just after the start trigger for the emergency report generated to the second time instant obtained at this instant is less than a given time period (Step S13).

Next, when determining that the time period is less than the given time period (Step 13: YES), the control unit 2 then obtains a second position from the positioning unit 5 at this instant (Step S14). The control unit 2 then determines whether a distance or a position difference from the first position obtained just after the start trigger for the emergency report generated to the second position obtained at this instant is less than a given distance (Step S15).

When determining that the distance is less than the given distance (Step S15: YES), the control unit 2 then determines whether re-start of an emergency report operation is cancelled by a user (Step S16).

When determining that re-start is not cancelled (Step S16: NO), the control unit 2 causes the wireless communications unit 3 to transmit an emergency report signal to the service center 10 via the wireless communications network. The emergency report operation is thereby re-started from an initial procedure (Step S17) to execute Steps S9, S10.

In contrast, (i) when determining that the time period is not less than the given time period (Step S13: NO), (ii) when determining that the distance is not less than the given distance (Step S15: NO), or (iii) when determining that re-start of an emergency report operation is cancelled (Step S16: YES), the control unit 2 ends the sequence of the process without re-starting the emergency report operation.

A response to the emergency report may be finished (i) when the time period from the first time instant obtained just after the start trigger generates to the second time instant obtained just after the battery voltage recovers to the given voltage or more becomes too long, or (ii) when the distance from the first position obtained just after the start trigger generates to the second position obtained just after the battery voltage recovers to the given voltage or more becomes too long. In this case, re-starting the emergency report operation from the initial procedure may become useless. To prevent the useless re-starting of the emergency report operation from the initial procedure, the re-starting is executed only when the time period is less than the given time period and also the distance is less than the given distance. In this embodiment, determination whether the response is finished or not is conducted based on both the time period and the distance; however, only either of them can be used for this determination.

Thus, according to the first embodiment, the emergency report device 1 performs as follows: When the battery voltage decreases from a given voltage or more to less than the given voltage after starting an emergency report operation, an emergency report operation is stopped (or interrupted). When the battery voltage thereafter recovers to the given voltage or more, the emergency report operation is re-started from the initial procedure. Therefore, unlike in a conventional device, the emergency report operation for transmitting an emergency report signal to the service center can be completed up to the final procedure without a dedicated accessory battery. Further, in this case, the emergency report operation is re-started from the initial procedure. Therefore, a procedure that is finished before the emergency report operation is interrupted need not be memorized, which decreases times or a frequency of writing on a memory. A simple structure of the emergency report device 1 can be thereby achieved.

Moreover, as explained above, the re-starting of the emergency report operation from the initial procedure is executed only when both of the time period (or elapsed time) and the distance (or traveled distance) from the first time instant to the second time instant is less than a given threshold. Here, the first time instant is just after the start trigger for the emergency report generates, whereas the second time instant is just after the given voltage recovers to the given voltage or more. Therefore, the emergency report operation can be re-started only under a state where its necessity for restarting the emergency report operation is affirmatively determined based on the elapsed time and the travel distance from interrupting of the emergency report operation.

Second Embodiment

Figure 3:
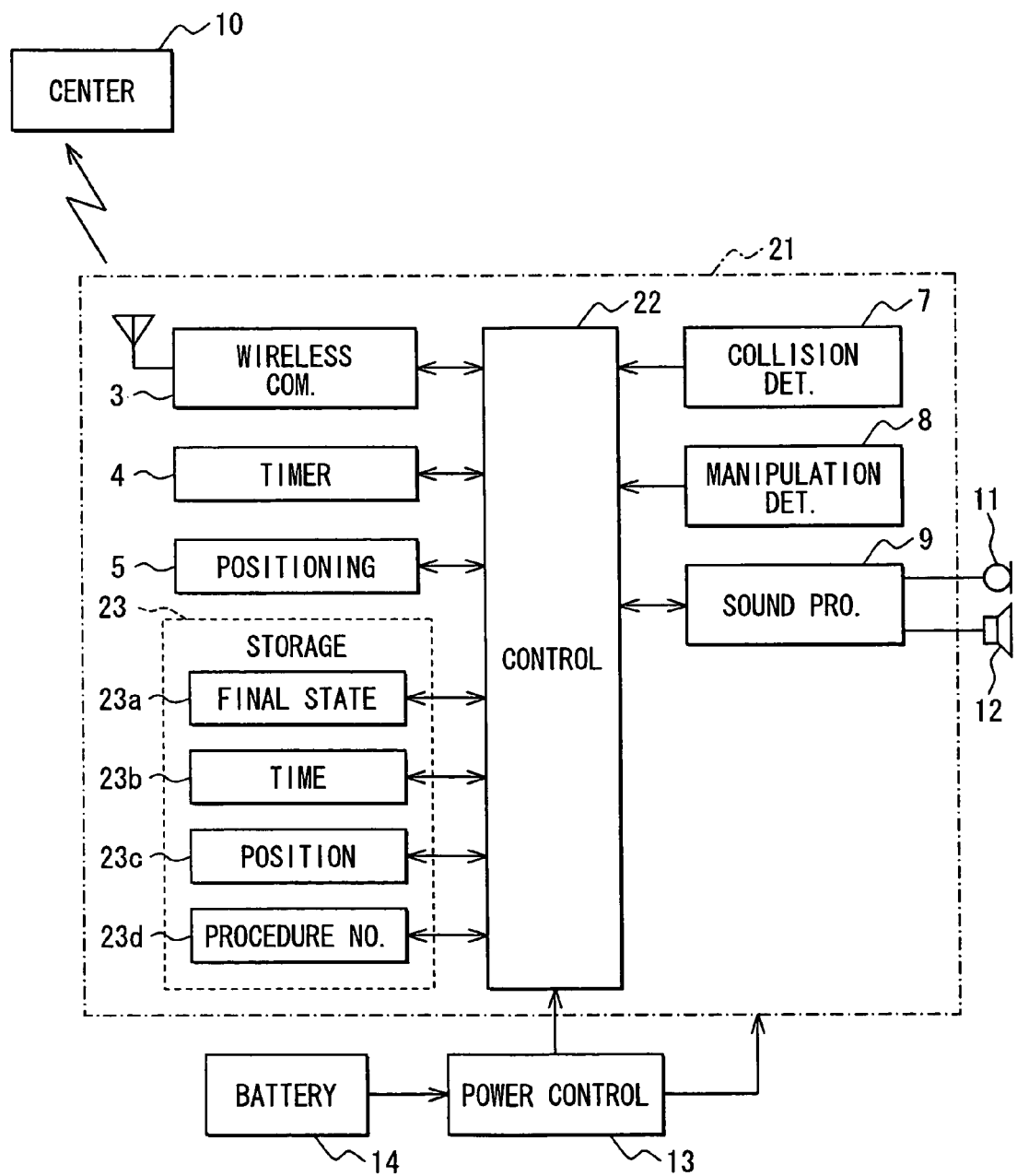
FIG. 3 is a functional block diagram of an overall structure of an in-vehicle emergency report device according to a second embodiment of the present invention.

A second embodiment will be explained with reference to FIGS. 3, 4. In the first embodiment, the emergency report operation is re-started from the initial procedure when the battery voltage recovers to the given voltage or more. In contrast, in the second embodiment, the emergency report operation is re-started from a procedure next to a procedure that has been finished before the operation is interrupted, when the battery voltage recovers to the given voltage or more.

An in-vehicle emergency report device 21 of the second embodiment includes a storage unit 23 instead of the storage unit 6 of the first embodiment. The storage unit 23 includes a final state storage unit 23a, a time storage unit 23b, a position storage unit 23c, and a procedure number storage unit 23d. The procedure number storage unit 23d stores a procedure number corresponding to a procedure that has been finished just before an emergency report operation is interrupted.

Figure 4:
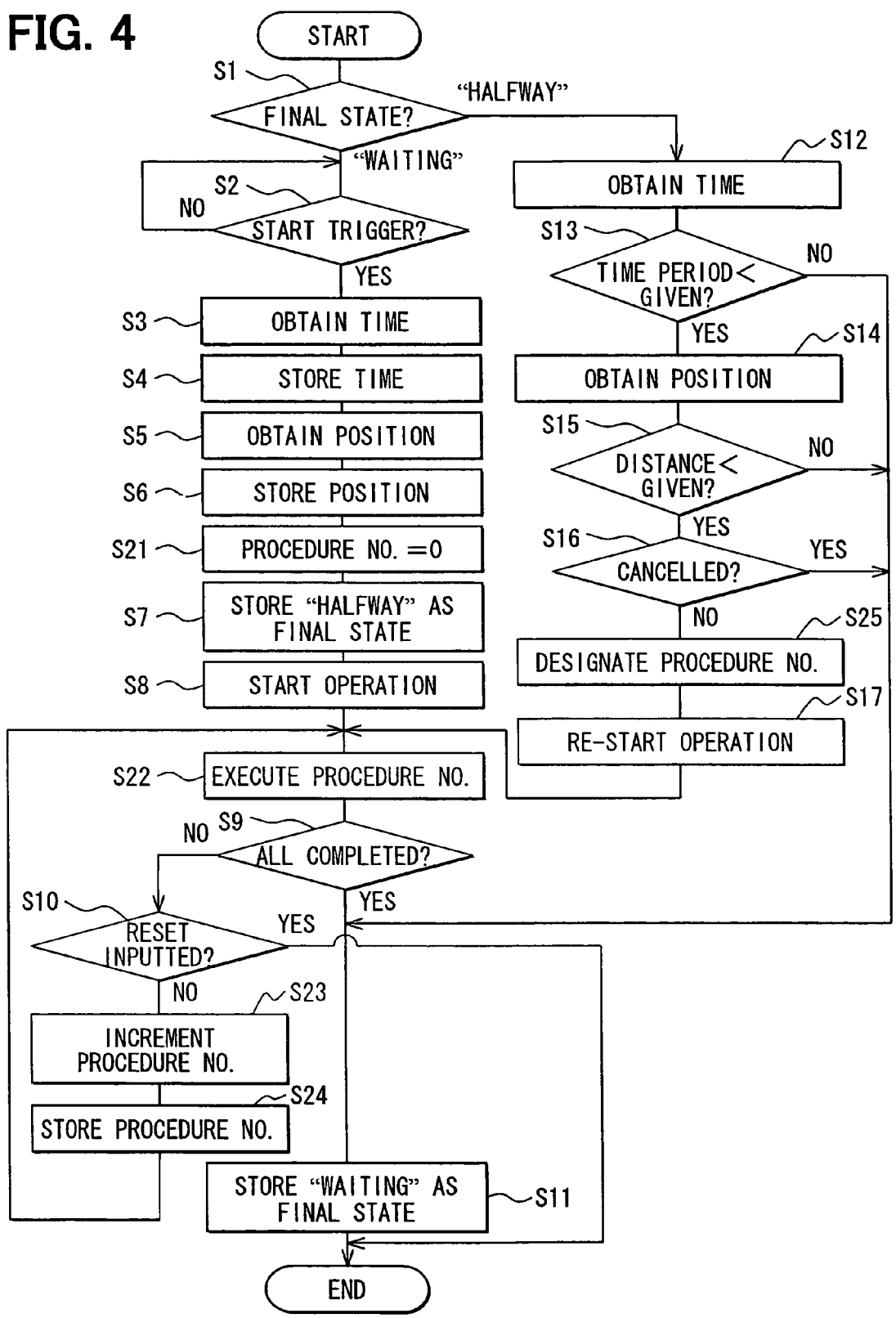
FIG. 4 is a flowchart diagram according to the second embodiment.

A control unit 22 of the emergency report device 21 executes a process shown in the flow chart in FIG. 4 when normally supplied with the battery voltage and a reset signal is not inputted from the power control unit 13.

When the control unit 22 detects that the start trigger generates (Step S2: YES), the control unit 22 causes the time storage unit 23b to store a time instant obtained from the timer unit 4 at this instant (Step S3, S4). The control unit 22 then causes the position storage unit 23c to store a position obtained from the positioning unit 5 at this instant (Step S5, S6). The control unit 22 sets "0" to a procedure number (Step S21) and then causes the final state storage unit 23a to store the "emergency reporting halfway" flag (Step S7).

The control unit 22 starts an emergency report operation by causing the wireless communications unit 3 to transmit an emergency report signal to the service center 10 via the wireless communications network (Step S8). The control unit 22 executes a procedure corresponding to the procedure number (Step S22). When finishing executing the procedure, the control unit 22 determines whether all procedures of the emergency report operation is completed (Step S9) and whether a reset signal is inputted from the power control unit 13 (Step S10), similarly to the first embodiment.

Here, when all the procedures are not completed (Step S9: NO) and a reset signal is not inputted (Step S10: NO), the control unit 22 increments the procedure number (Step S23), causes the procedure number storage unit 23d to store the incremented procedure number (Step S24), and subsequently repeats the above-mentioned steps. When detecting that all the procedures of the emergency report operation is completed (Step S9: YES) without receiving the reset signal from the power control unit 13, the control unit 22 causes the final state storage unit 23a to store the "waiting" flag (Step S11) and then ends the sequence of the process.

In contrast, when receiving the reset signal from the power control unit 13 (Step S10: YES) before detecting that all the procedures of the emergency report operation is completed, the control unit 22 ends the sequence of the process without causing the final state storage unit 23a to store the "waiting" flag.

Subsequently, when the battery voltage that once decreased to less than the given voltage recovers to the given voltage or more and the reset signal thereby becomes not being inputted from the power control unit 13, the control unit 22 executes Steps S12 to S16 and then designates a procedure number (Step S25). The designated procedure number is next to the procedure number stored in the procedure number storage unit 23d, and corresponds to a procedure following the procedure that has been finished just before the emergency report operation is interrupted. The emergency report operation is re-started (Step S17) and the procedure corresponding to the designated procedure number is executed (Step S22). The process subsequent to Step S22 is then executed.

Thus, according to the second embodiment, the emergency report device 21 performs as follows: When the battery voltage decreases from a given voltage or more to less than the given voltage after starting an emergency report operation, an emergency report operation is stopped (or interrupted). When the battery voltage thereafter recovers to the given voltage or more, the emergency report operation is re-started from the procedure following the procedure that has been finished just before the operation is interrupted. Therefore, like the first embodiment, the emergency report operation for transmitting an emergency report signal to the service center can be completed up to the final procedure without a dedicated accessory battery. Further, here, in the second embodiment, the emergency report operation is re-started from the procedure following the procedure that has been finished just before the operation is interrupted. Therefore, a time period from when the operation is re-started to when the final procedure of the emergency report operation is completed can be decreased.

Other Embodiments

The present invention is not limited to the above embodiments, but can be modified or extended as follows.

An in-vehicle emergency report device can be partially or entirely included in a navigation device.

A start trigger for an emergency report can be based on other than the vehicle's collision with an obstacle or a human or the user's depression of an emergency report button.

Figure 2:
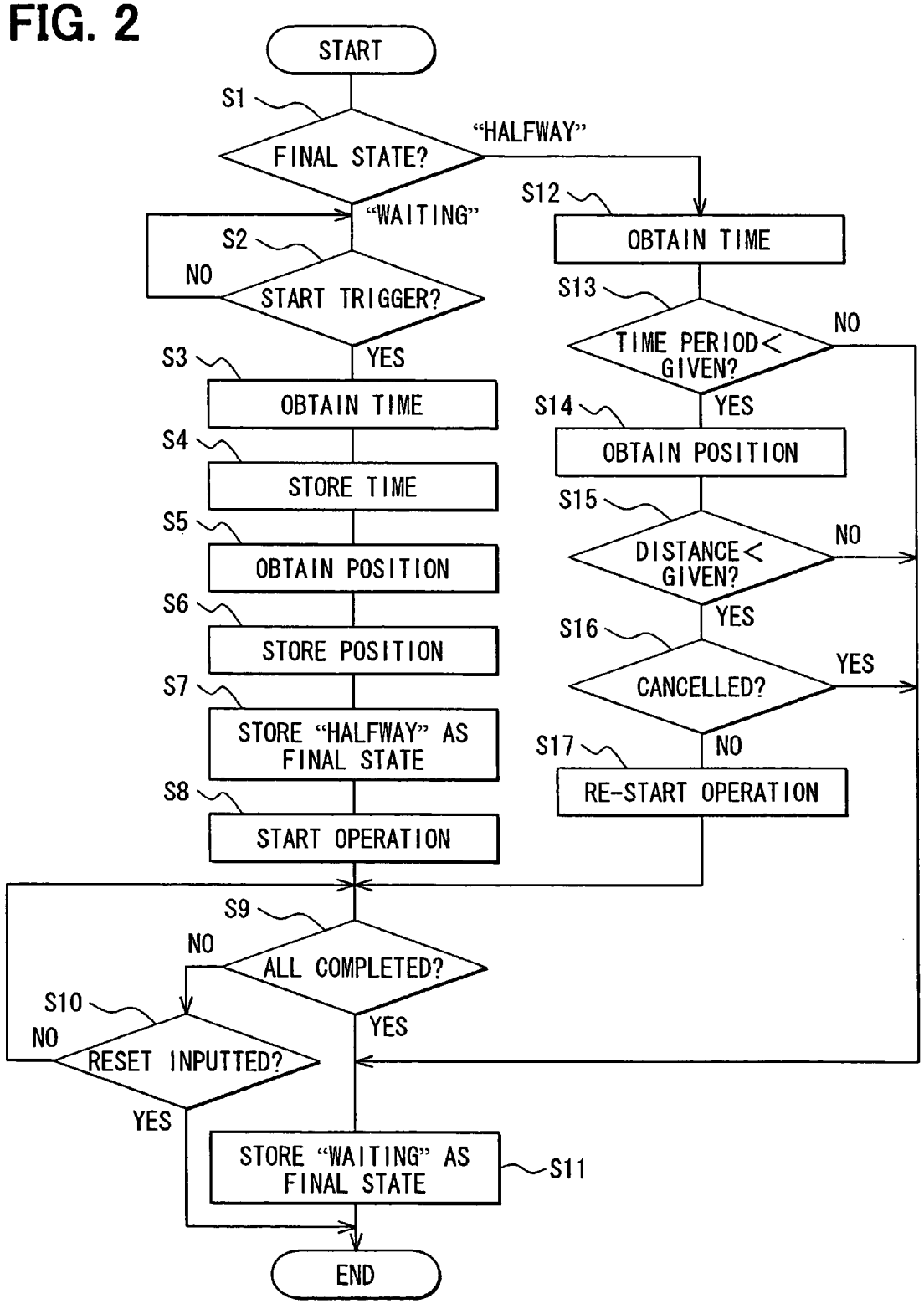
FIG. 2 is a flowchart diagram according to the first embodiment.

In the flowchart in FIG. 2, after the battery voltage that once decreased to less than the given voltage recovers to the given voltage or more, the emergency report operation can be re-started without executing some or all of determinations at Steps S13, S15, S16.

The steps in the process of the flowcharts in FIGS. 2, 4 may be constructed as means or units in program stored in a memory of the CPU.

It will be obvious to those skilled in the art that various changes may be made in the above-described embodiments of the present invention. However, the scope of the present invention should be determined by the following claims.

What is claimed is:

1. An in-vehicle emergency report device comprising:
transmission means for transmitting a signal of an emergency report to a service center; and
control means for starting, when a start trigger for the emergency report generates, an operation of the emergency report to cause the transmission means to transmit the signal to the service center; wherein
means for interrupting the operation when a battery voltage of a single battery which supplies power to the in-vehicle emergency report device decreases to less than a given voltage after having started the operation, and
means for re-starting the operation when the battery voltage of the single battery recovers to the given voltage; wherein
the in-vehicle emergency report device, further comprising:
a timer unit for registering a time instant, wherein
the restarting means re-starts the operation when a time period from a first time instant obtained from the timer unit just after the start trigger generates to a second time instant obtained from the timer unit just after the battery voltage of the single battery returns to the given voltage is less than a given time period, and
the restarting means does not re-start the operation when the time period is not less than the given time period.

2. The in-vehicle emergency report device of claim 1, wherein the single battery is the only power source for the in-vehicle emergency device.

3. An in-vehicle emergency report device comprising:
transmission means for transmitting a signal of an emergency report to a service center; and
control means for starting, when a start trigger for the emergency report generates, an operation of the emergency report to cause the transmission means to transmit the signal to the service center; wherein
means for interrupting the operation when a battery voltage of a single battery which supplies power to the in-vehicle emergency report device decreases to less than a given voltage after having started the operation, and
means for re-starting the operation when the battery voltage of the single battery recovers to the given voltage; wherein
the in-vehicle emergency report device, further comprising:
a positioning unit for detecting a position, wherein
the restarting means re-starts the operation when a distance from a first position obtained from the positioning unit just after the start trigger generates to a second position obtained from the positioning unit just after the battery voltage of the single battery returns to the given voltage is less than a given distance, and
the restarting means does not re-start the operation when the distance is not less than the given distance.

4. The in-vehicle emergency report device of claim 3, wherein the single battery is the only power source for the in-vehicle emergency device.

* * * * *